A. RICIGLIANO.
SIGNALING DEVICE.
APPLICATION FILED MAY 4, 1920.
1,388,060.
Patented Aug. 16, 1921.
3 SHEETS—SHEET 2.
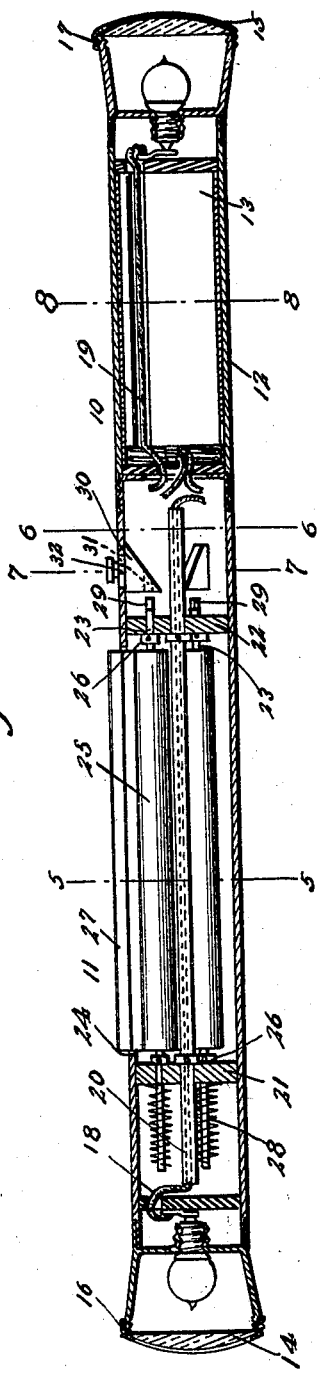
A. Ricigliano INVENTOR
BY Victor J. Evans
ATTORNEY
WITNESSES A. RICIGLIANO.
SIGNALING DEVICE.
APPLICATION FILED MAY 4, 1920.
1,388,060.
Patented Aug. 16, 1921.
3 SHEETS—SHEET 3.
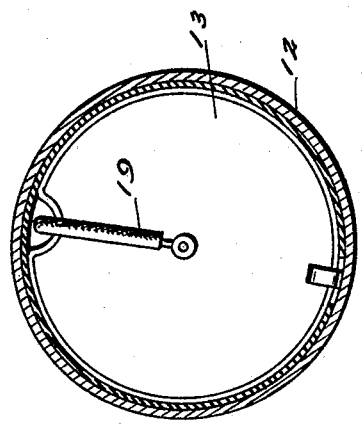
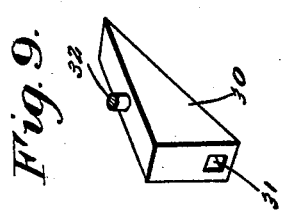
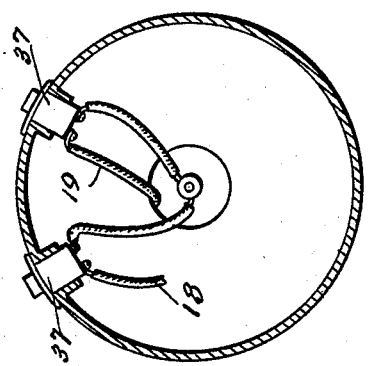
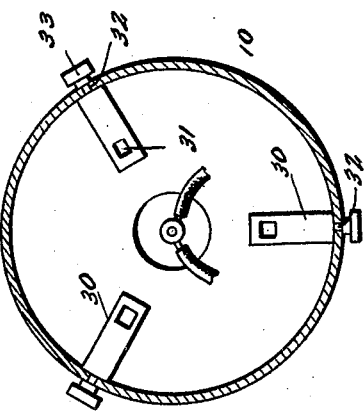
WITNESSES
R. A. Thomas
INVENTOR
A. Ricigliano
BY Victor J. Evans
ATTORNEY

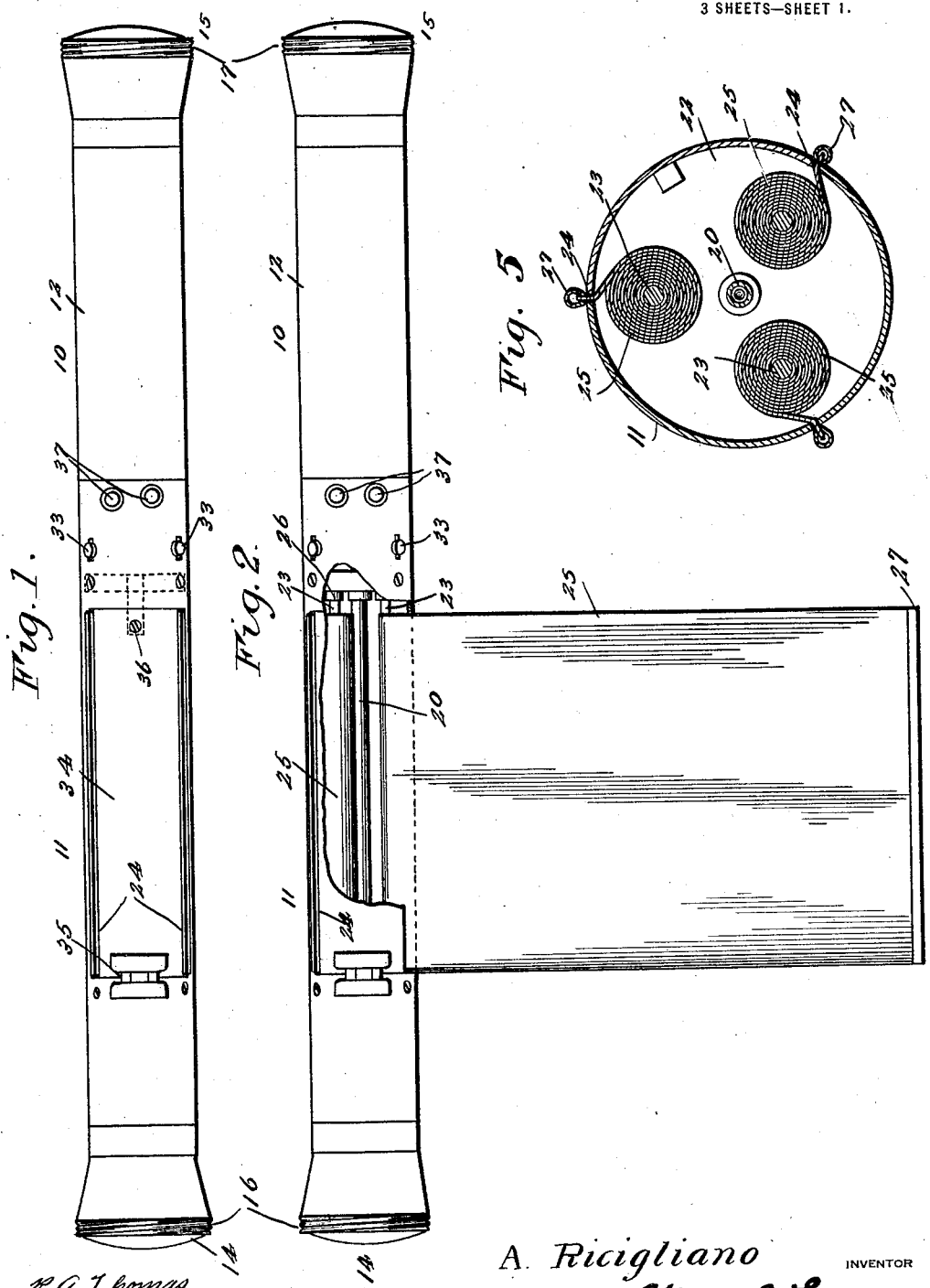

UNITED STATES PATENT OFFICE.

ANTHONY RICIGLIANO, OF BUFFALO, NEW YORK.

SIGNALING DEVICE.

1,388,060. Specification of Letters Patent. Patented Aug. 16, 1921.

Application filed May 4, 1920. Serial No. 378,903.

*To all whom it may concern:*

Be it known that I, ANTHONY RICIGLIANO, a citizen of the United States of America, residing at Buffalo, in the county of Erie and State of New York, have invented new and useful Improvements in Signaling Devices, of which the following is a specification.

The object of the invention is to provide a simple and efficient means whereby a watchman at grade crossings, as of railroads, may have within the range and compass of a single device or apparatus the means for giving the different signals to passing trains and to pedestrians or drivers on the cross road to indicate safety or danger or caution as the case may be, whether in daylight or at night, and whereby a change of signals may be effected with the minimum effort upon the part of the operator to suit the rapidly changing conditions incident to the requirement of the watchman's work or duties, and with these objects in view the invention consists in a construction and combination of parts of which a preferred embodiment is shown in the accompanying drawings, wherein:

Figure 1 is a side view of the signaling device.

Fig. 2 is a similar view partly broken away with one of the signal flags displayed.

Fig. 3 is a longitudinal sectional view of the casing.

Fig. 4 is a similar view taken at right angles to the plane of Fig. 3.

Figs. 5, 6, 7 and 8 are cross sectional views on the planes indicated respectively by the lines 5—5, 6—6, 7—7 and 8—8 of Fig. 3.

Fig. 9 is a detail view of one of the spindle locking elements. Fig. 10 is a diagrammatic view of the wiring of the lamps.

The apparatus consists essentially of a tubular casing 10, of which one portion indicated at 11 forms a housing for the signal flag while the other portion indicated at 12 constitutes a grip or handle and a housing for a battery 13 for supplying the terminal search lights 14 and 15, respectively white and red for use in signaling at night, the lens of said lights being held in place by caps 16 and 17 which are threaded upon the ends of the casing. The battery wires 18 and 19 extend respectively through the globes of the headlights, the former extending through a tube 20 which is disposed longitudinally and approximately centrally of the housing portion 11 of the casing and supported by heads 21 and 22 which are secured at spaced points in the casing and are also provided with bearings for the flag spindles 23 disposed adjacent to longitudinal exit slots 24 formed in the wall of the casing to permit of the extension of the flags 25, preferably colored respectively white, green and red, so that when the particular flag which is desired for display is extended the casing may be employed as a staff to permit the watchman to waive the same to give the desired signal either to the train engineer or to pedestrians or drivers on the cross road.

The flag spindles are provided with collars 26 for preventing endwise movement of the spindles while permitting rotation thereof, said spindles serving as drums upon which the flags are wound or reeled when not in use, and terminal stops 27 being provided on the outer edges of the flags to prevent the complete withdrawal of the flags or in other words to hold the terminal edges thereof within reach from the exterior of the operator so that the desired flag may be extended. Also upon each flag spindle is coiled an actuating spring 28 tending to turn the spindle to reel or roll the flag thereon, and adjacent to the squared or cross sectionally angular extremity 29 of each flag spindle is mounted a locking pin consisting of a block 30 provided with an angular socket 31 for the reception of the end of the corresponding flag spindle, to hold the latter when the flag is extended to temporarily prevent the reeling of the flag by means of the actuating spring. Obviously when it is desired to fold or conceal the flag it is simply necessary to withdraw the block sufficiently to disengage the spindle. These blocks are slidingly mounted upon the wall of the casing in convenient relation respectively to the flag spindles and are held in place by stems 32 having exposed thumb holds or buttons 33 within convenient reach of the hand grasping the grip portion of the casing.

In order to give access to the interior of the flag housing portion of the casing a closure 34 is hinged as at 35 and is provided at its free end with a turn button or similar fastening means 36. Also in the conductors extending from the battery to the lamps of the search lights switches 37 are included so that either of the lamps may be connected with the battery according to the signal which is to be given.

With an apparatus constructed as described, it will be understood that it is within the ability of the crossing watchman, without changing his position or interchanging the implement or apparatus, to give any required signal, changing from one to another as the circumstances may require, and to give the signals either in day light or at night with equal facility, the flags being conveniently and safely housed when not in use so as to be protected from accumulations of dirt and the effect of the weather, and at the same time the complete apparatus does not occupy much more if any space than the ordinary signal flags such as those now in common use in this connection, with the added advantage that all of the required signaling means are contained in a single apparatus, so that all of the flags required for different conditions or emergencies are equally accessible to the operator.

What is claimed is:—

A signaling device having a tubular casing provided with a grip portion and a flag housing portion fitted with longitudinal exit slots, spring actuated spindles mounted in said housing portion and having reeled thereon flags of different signaling significance for extension through the said slots in the casing, the housing portion of the casing being provided with a movable closure for giving access to the interior thereof, and locking means consisting of sliding blocks provided with sockets for the reception of cross sectionally irregular terminals of the spindles for securing the latter when the flags are in their extended position, said blocks being provided exteriorly of the casing with operating buttons.

In testimony whereof I affix my signature.

ANTHONY RICIGLIANO.